(12) United States Patent
Norman

(10) Patent No.: US 8,454,262 B2
(45) Date of Patent: Jun. 4, 2013

(54) SHELF CLIP

(75) Inventor: Christopher Norman, Menomonee Falls, WI (US)

(73) Assignee: Menasha Corporation, Neenah, WI (US)

( * ) Notice: Subject to any disclaimer, the term of this patent is extended or adjusted under 35 U.S.C. 154(b) by 746 days.

(21) Appl. No.: 12/620,768

(22) Filed: Nov. 18, 2009

(65) Prior Publication Data

US 2010/0129146 A1 May 27, 2010

Related U.S. Application Data

(60) Provisional application No. 61/116,801, filed on Nov. 21, 2008.

(51) Int. Cl.
*E21B 17/046* (2006.01)
*B65D 1/24* (2006.01)

(52) U.S. Cl.
USPC ........... 403/331; 403/353; 220/532; 220/533; 248/225.11

(58) Field of Classification Search
USPC .................. 403/238, 331, 353; 220/532, 533; 248/225.11
See application file for complete search history.

(56) References Cited

U.S. PATENT DOCUMENTS

| | | | | | |
|---|---|---|---|---|---|
| 197,667 | A | * | 11/1877 | Roberts | 403/331 |
| 1,520,520 | A | * | 12/1924 | Thomason | 108/153.1 |
| 2,103,106 | A | * | 12/1937 | Yurkovitch | 248/223.41 |
| 3,011,235 | A | * | 12/1961 | Pacheco | 172/776 |
| 3,039,340 | A | * | 6/1962 | Zimmerman | 81/177.85 |
| RE30,850 | E | * | 1/1982 | Gordy et al. | 403/197 |
| 4,324,503 | A | * | 4/1982 | Sevrence | 403/197 |
| 4,389,133 | A | * | 6/1983 | Oberst | 403/230 |
| 4,565,465 | A | * | 1/1986 | Oberst | 403/187 |
| 4,787,595 | A | * | 11/1988 | Hegarty | 248/454 |
| 4,828,133 | A | * | 5/1989 | Hougendobler | 220/533 |
| 4,925,146 | A | * | 5/1990 | Hegarty | 248/454 |
| 4,929,116 | A | * | 5/1990 | Mahl | 403/263 |
| 4,976,567 | A | * | 12/1990 | Spier | 403/231 |
| 5,044,594 | A | * | 9/1991 | Hegarty | 248/454 |
| 5,080,238 | A | * | 1/1992 | Hochman | 211/59.1 |
| 5,707,033 | A | * | 1/1998 | Holt et al. | 248/225.11 |
| 6,641,420 | B2 | * | 11/2003 | Blanchfield et al. | 439/247 |
| D549,564 | S | * | 8/2007 | Lucht | D8/381 |
| D550,070 | S | * | 9/2007 | Lucht | D8/381 |
| 8,186,726 | B2 | * | 5/2012 | Zuo | 292/57 |

* cited by examiner

*Primary Examiner* — Victor MacArthur
(74) *Attorney, Agent, or Firm* — Ungaretti & Harris LLP

(57) ABSTRACT

A two-piece connector for connecting two pieces of corrugated material. A first connector piece configured to connect to a first piece of corrugated material includes a flange connected to a first connecting mechanism. A second connector piece configured to connect to a second piece of corrugated material includes a second connecting mechanism configured to cooperate with the first connecting mechanism of the first connector piece.

9 Claims, 2 Drawing Sheets

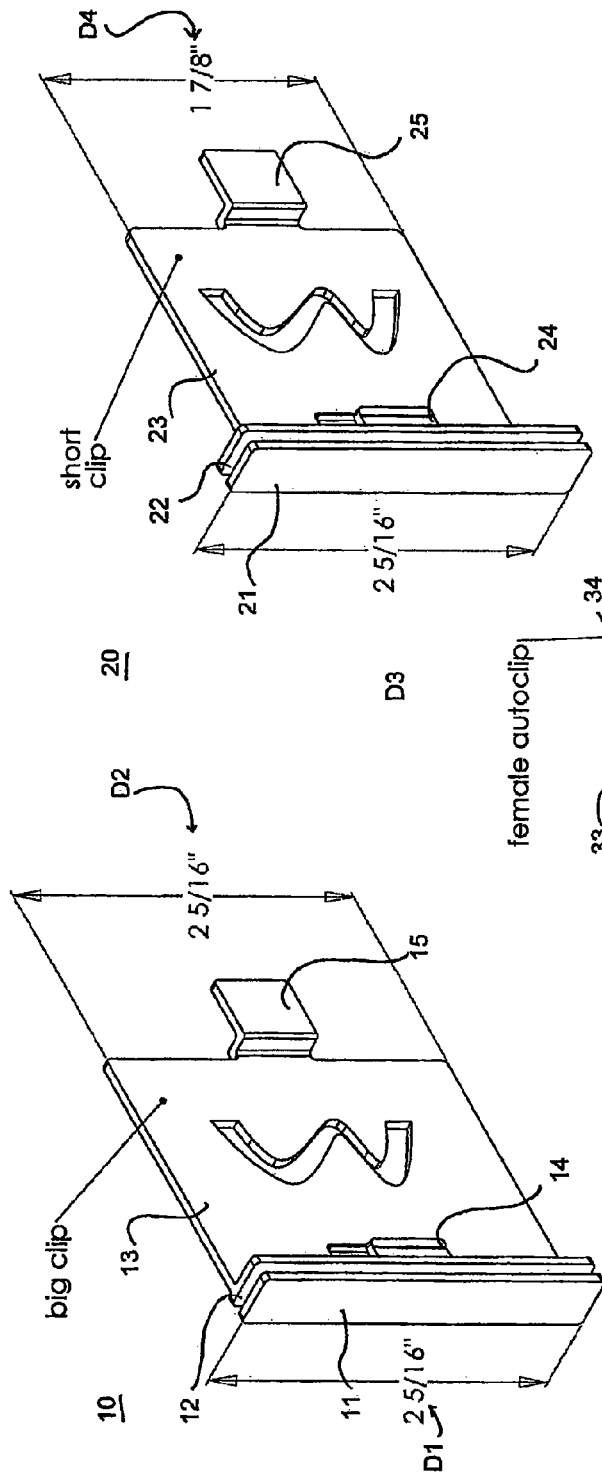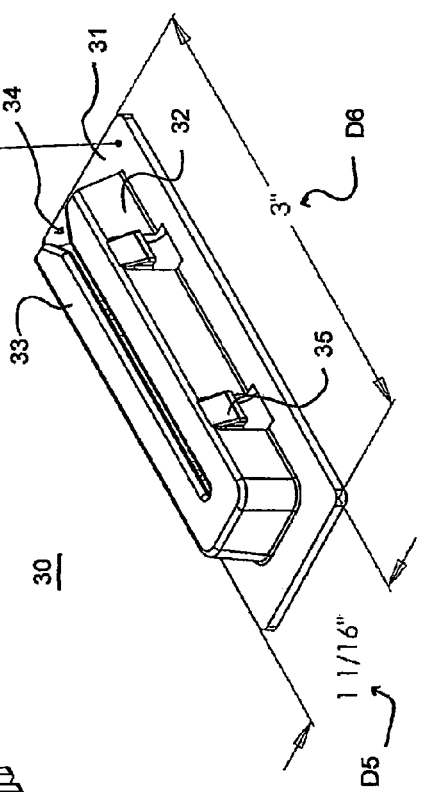

SHELF CLIP

CROSS-REFERENCE TO RELATED APPLICATIONS

This application claims the benefit of currently pending U.S. Provisional Patent Application No. 61/116,801, filed Nov. 21, 2008, which is hereby incorporated by reference as is fully set forth herein.

FEDERALLY SPONSORED RESEARCH OR DEVELOPMENT

N/A

FIELD OF THE INVENTION

The present invention is generally directed to an assembly for connecting pieces or sheets of corrugated material, and more particularly to assembly comprising a male connector and a female connector.

BACKGROUND AND SUMMARY OF THE INVENTION

Corrugated materials have long been used for packing, display shelving and more recently, for furniture and other novel applications. A corrugated material, such as cardboard, is generally light and sturdy as compared with similar materials and can offer a cost advantage. Being able to connect panels or sheets of corrugated material in a way to create various shapes or structures, and maintain the structural integrity and strength of the material is important to those working with corrugated materials.

SUMMARY OF THE INVENTION

An aspect of the present invention is to provide a male connector and female connector for use with corrugated materials which quickly and easily allows for the connection of corrugated materials to each other.

A further aspect of the present invention is to have the male connector and female connector capable of locking in place to stabilize the corrugated material and prevent connected corrugated materials from moving with respect to one another.

It is a further aspect of the present invention for the male connector to securely connect to the corrugated material and be capable of providing additional support thereof According to one aspect, the present invention comprises a male connector and a female connector. The male connector includes a first ledge and a second ledge, wherein the first and second ledges are connected by a spine substantially perpendicular to the first and second ledge. The second ledge is further connected to a flange perpendicular to the second ledge. The male connector further contains a first offset locking tongue and a second offset locking tongue, wherein the first offset locking tongue extends from a far end of the flange removed from an end of the flange connected to the second ledge, and the second offset locking tongue is connected to and protrudes from the second ledge in a substantially perpendicular orientation.

The female connector comprises a flat back portion which supports a connected U-shaped receiving slot. The connector includes locking clips along the perimeter of the receiving slot to secure the female connector to the corrugated material.

The male connector and female connector are configured in such a manner that the first ledge of the male connector slides into an open end of the receiving slot of the female connector.

Accordingly, the present invention is directed to a male connector and female connector for corrugated material which improves upon currently existing connectors for corrugated materials.

In accordance with one embodiment of the invention, a two-piece connector is provided. The two-piece connector comprises a first connector piece including a first planar ledge portion and a second planar ledge portion connected by a spine perpendicular to the first planar ledge portion and the second planar ledge portion. A flange extends from a first end connected to a first side of the second planar ledge portion. The two-piece connector further comprises a second connector piece including a base, a wall portion extending upward from the base configured to house the first planar ledge portion of a first connector piece, and a front panel having a slot extending from a first open side. The second connector piece is sized to receive the first planar ledge portion of the first connector piece such that the spine of the first planar connector piece extends through the slot of the second connector piece. Each piece of the connector is configured to be secured to a piece of corrugated material. Preferably, each piece of the connector is formed from plastic.

The wall portion of the second connector piece is continuous and U-shaped (from a top perspective) with an open end corresponding with the first open side of the front panel. In alternative embodiments, the wall portion can be other shapes, such as rectangular with an open end, or be in one or more segments.

The base can include a portion that extends outward past the wall portion. The second connector can further include a plurality of locking clips extending from an upper portion of the wall wherein the locking clips cooperate with the portion of the base extending past the wall portion to connect with a corrugated material.

The first connector piece can further include an offset first tongue extending from a second end of the flange distal from the first end of the flange connected to the second side of the second ledge. Additionally, the first connector piece can include a second tongue extending from a second side of the second ledge. The offset of the first tongue can be sized to align the first tongue in a plane with the second tongue. The first tongue and the second tongue are configured to secure the first connector piece to a piece of corrugated material.

The flange can have a width substantially equal to a width of the second ledge. Alternatively, the flange can have a width less than a width of the second ledge.

In accordance with another embodiment of the invention, a two-piece connector for use with corrugated material is provided. The two-piece connector comprises a first connector piece configured to be secured to a first piece of corrugated material. The first connector piece includes a first connecting mechanism. The two-piece connector also comprises a second connector piece configured to be secured to a second piece of corrugated material. The second connector piece includes a second connecting mechanism configured to cooperate with the first connecting mechanism to connect the first connector piece to the second connector piece.

The first connecting mechanism can include a first planar ledge and a second planar ledge connected by a spine perpendicular to the first and second planar ledges.

The second connecting mechanism can include a base supporting a wall portion, and a front panel connected to a top of the wall portion. A plurality of locking clips extend from the wall portion. The front panel includes a slot with a first open end and a second closed end. The second connecting mechanism is configured to receive the first ledge of the first connecting mechanism.

The first connector piece can include a flange connected at a first end to the first connecting mechanism. A first tongue can be connected to and extend from a second end of the flange. The first tongue can be offset from a plane of the flange by an extension panel perpendicular to the flange. The first connector piece can further include a second tongue connected to the first connecting mechanism.

Other features and advantages of the invention will be apparent from the following specification taken in conjunction with the following Figures and Attachments.

BRIEF DESCRIPTION OF THE FIGURES

To understand the present invention, it will now be described by way of example, with reference to the accompanying Figures and Attachment in which:

FIG. 1 is a perspective view of a male or first clip connector piece (big clip) in accordance with one embodiment of the present invention;

FIG. 2 is a perspective view of another male or first clip connector piece (short clip) in accordance with another embodiment of the present invention;

FIG. 3 is a perspective view of a female or second clip connector piece in accordance with the present invention; and, FIG. 4 is a side plan view of the first clip connector piece of FIG. 1.

DETAILED DESCRIPTION OF THE INVENTION

Figure 4:
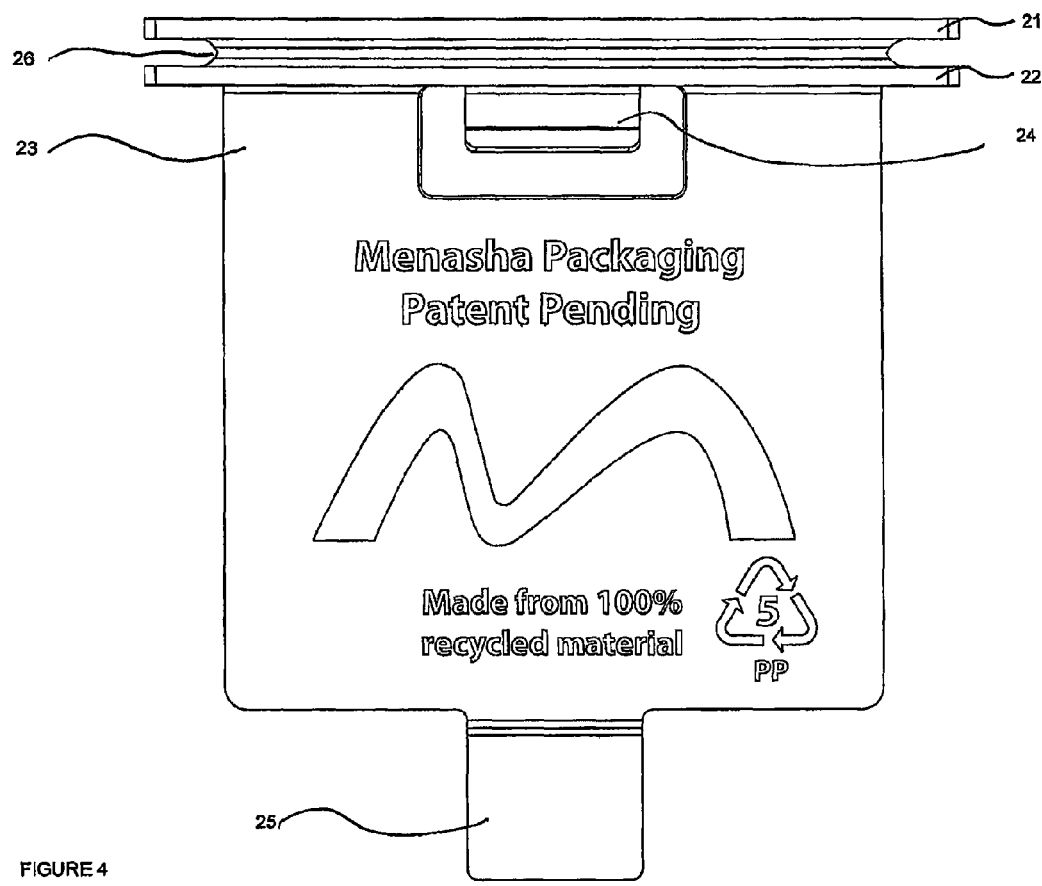

While this invention is susceptible of embodiments in many different forms, there is shown in the Figures and will herein be described in detail preferred embodiments of the invention with the understanding that the present disclosure is to be considered as an exemplification of the principles of the invention and is not intended to limit the broad aspect of the invention to the embodiments illustrated.

FIGS. 1 and 2 represent two versions of a male or first connector piece 10, 20. Both first connector pieces 10, 20 are designed to interconnect with a female or second connector piece 30 shown in FIG. 3. In this regard, the first connector piece includes a first connecting mechanism and the second connector piece includes a second connecting mechanism.

Referring to FIG. 1, the first connector piece 10 includes a base portion having a first planar ledge 11 and a second planar ledge 12 parallel to the first ledge 11. The first and second ledges 11, 12 are separated a short distance and connected by a spine substantially perpendicular to the ledges 11, 12. Similarly, the first clip connector piece 20 of FIG. 2 also includes a first ledge 21 and a second ledge 22 connected in a spaced parallel relationship to the first ledge 21 by a spine 26 (the spine 26 of the first clip connector piece 20 is more clearly illustrated in FIG. 4) substantially perpendicular to the first and second ledges 21, 22. As is evident in FIG. 4, the spine 26 is positioned in the middle of the ledges 21, 22. The first ledge, second ledge and spine form the first connecting mechanism in this embodiment.

The first and second ledges 11, 12 and 21, 22 are substantially rectangular in shape and have the same dimensions. However, other similar configurations can be used. The spine 26 is positioned and sized to facilitate connection of either of the first clip connector pieces 10, 20 to the second clip connector piece 30.

In the embodiment of FIG. 1, the second ledge 12 is further connected to a flange 13 which extends perpendicular to the second ledge 12 from a first side of the second ledge 12. The flange 13 is substantially similar in width to the second ledge 12 (i.e., the flange 13 extends from one end of the second ledge 12 to the other end of the second ledge 12).

In the embodiment of FIG. 2, a flange 23 extends from a first side of the second ledge 22. The flange 23 of FIG. 2 is narrower than the second ledge 22. However, in both embodiments, the ledges 11, 12 and 21, 22 have the same or substantially similar dimensions and can be used with the same second connector piece 30 as described below.

The first connector piece 10 of FIG. 1 further contains a first offset locking tongue 14 and a second offset locking tongue 15. The first offset locking tongue 14 is connected to and protrudes from the second ledge 12 in a substantially perpendicular orientation, and the second offset locking tongue 15 extends from the far end of the third ledge 13. Similarly, the first connector piece 20 of FIG. 2 includes a first offset locking tongue 24 and a second offset locking tongue 25. The first offset locking tongues 14, 24 are positioned on a second side of the second ledge 12, 22 opposite the flange 13, 23 and include a central opening.

The first offset locking tongues 14, 24 and the second offset locking tongues 15, 25 are configured to interconnect or be inserted into corrugated material (such as a corrugated cardboard sheet) to allow the first clip connector piece 10, 20 to attach to and hold the corrugated material.

FIG. 3 shows the second connector piece 30 which can be coupled to either one of the first connector pieces 10, 20. The second connector piece 30 has a second connecting mechanism which includes a flat base portion 31. The second connecting mechanism also includes a U-shaped wall portion 32 which extends from and is substantially perpendicular to the base portion 31. In this regard, the base 31 forms a bottom wall of the second connecting mechanism. While the wall portion 32 is preferably U-shaped, the wall portion can be other shapes, such as rectangular with an open end, or be two or more wall segments (possibly having gaps therebetween) generally defining a housing or enclosure for securing the first ledge 11, 21 of the first connector piece 20, 30.

A front panel 33 with a receiving slot 34 having a first open end and a second closed end is connected to an upper portion of the U-shaped wall portion 32. Together, the base portion 31, the connected U-shaped portion 32, and the front panel 33 form the connecting mechanism for receiving the first ledge 11, 21 of the first connector piece 10, 20. The spine connecting the first and second ledges is sized and positioned to fit in the slot 34 of the second connector piece 30 through its open end. In this manner, the first clip connector piece 10, 20 can slidingly engage the second clip connector piece 30.

While the wall portion 32 is shown as being generally U-Shaped (i.e., from a top down perspective), it is only necessary for the front panel to be U-shaped or have some stop at one end to limit movement of the first connector piece 10, 20 (e.g., by limiting movement of the spine). This will prevent the first connector piece 10, 20 from sliding complete through the second connector piece. An additional piece can be secured to the open end of the wall portion of the second connector piece 30 to secure and lock the first connector piece 30 to the second connector piece 30.

The second connector piece 30 also includes locking clips 35 along the perimeter of the U-shaped wall portion 32 to affix the second connector piece 30 to another piece of corrugated material.

While the first connector pieces 10, 20 are shown with a double ledge configuration (separated by a spine) and the second connector piece 30 is shown with a connecting mechanism having an interior and slot for securing the first ledge, these components can be switched such that the first connector piece has a housing with a slot at one end of the flange, and the second connector piece has a first ledge (i.e., the base) connected to a second ledge by a spine. The resultant two-piece connector would operate in essentially the same manner as before with (in this instance) the second ledge of the second connector piece being slidable into the connecting mechanism of the first connector piece.

While the specific embodiments have been illustrated and described, numerous modifications come to mind without significantly departing from the spirit of the invention and the scope of protection is only limited by the scope of the accompanying Claims.

What is claimed is:

1. A two-piece connector comprising:
a first connector piece including a first planar ledge portion and a second planar ledge portion connected by a spine perpendicular to the first planar ledge portion and the second planar ledge portion, and a flange extending from a first end of the flange connected to a first side of the second planar ledge portion;
a second connector piece including a base, a wall portion extending upward from the base, the wall portion having locking clips and being configured to house the first planar ledge portion of a first connector piece, and a front panel having a slot extending from a first open side wherein the second connector piece is sized to receive the first planar ledge portion of the first connector piece such that the spine of the first planar connector piece extends through the slot of the second connector piece;
a first offset tongue extending from a second side of the second planar ledge; and
a second offset tongue extending from a second end of the flange distal from the first flange end connected to the first side of the second planar ledge portion.

2. The two-piece connector of claim 1 wherein the wall portion of the second connector piece is continuous and U-shaped with an open end corresponding with the first open side of the front panel.

3. The two-piece connector of claim 1 wherein the base includes a portion that extends outward past the wall portion.

4. The two-piece connector of claim 3 wherein the locking clips extend from an upper portion of the wall and wherein the locking clips cooperate with the portion of the base extending past the wall portion to connect with a corrugated material.

5. The two-piece connector of claim 1 wherein the first piece and the second piece are formed from plastic.

6. The two-piece connector of claim 1 wherein the offset of the second offset tongue extending from the second end of the flange aligns the tongue extending from the second end of the flange in a plane with the first offset tongue extending from the second side of the second ledge.

7. The two-piece connector of claim 6 wherein the second offset tongue extending from the second end of the flange and the first offset tongue extending from the second side of the second ledge are configured to secure the first connector piece to a piece of corrugated material.

8. The two-piece connector of claim 1 wherein the flange has a width substantially equal to a width of the second ledge.

9. The two-piece connector of claim 1 wherein the flange has a width less than a width of the second ledge.

* * * * *